US012415352B2

(12) United States Patent
Nakagawa et al.

(10) Patent No.: US 12,415,352 B2
(45) Date of Patent: Sep. 16, 2025

(54) LIQUID EJECTION HEAD, LIQUID EJECTION APPARATUS, AND EJECTION MODULE

(71) Applicant: CANON KABUSHIKI KAISHA, Tokyo (JP)

(72) Inventors: Yoshiyuki Nakagawa, Kanagawa (JP); Naoko Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 18/229,759

(22) Filed: Aug. 3, 2023

(65) Prior Publication Data

US 2024/0042757 A1 Feb. 8, 2024

(30) Foreign Application Priority Data

Aug. 4, 2022 (JP) ................................ 2022-124711

(51) Int. Cl.

| | |
|---|---|
| ***B41J 2/24*** | (2006.01) |
| ***B41J 2/14*** | (2006.01) |
| ***B41J 2/175*** | (2006.01) |

(52) U.S. Cl.

CPC .......... *B41J 2/14072* (2013.01); *B41J 2/175* (2013.01)

(58) Field of Classification Search

CPC . B41J 2/14072; B41J 2/175; B41J 2/14; B41J 2/2132; B41J 29/38; B41J 2002/14419; B41J 2002/14491; B41J 2202/20

See application file for complete search history.

(56) References Cited

U.S. PATENT DOCUMENTS

2005/0162468 A1* 7/2005 Silverbrook .......... B41J 11/057 347/42

* cited by examiner

*Primary Examiner* — Bradley W Thies

(74) *Attorney, Agent, or Firm* — Venable LLP

(57) ABSTRACT

A liquid ejection head that is compact and whose reliability of an electrical connection portion is high includes a plurality of sets of element substrates in which a plurality of ejection elements ejecting a liquid of the same type is arrayed and a plurality of sets of electrical wiring members for supplying electric power to the element substrates. Each element substrate is arrayed in a second direction inclined with respect to a first direction in which the plurality of ejection elements is arrayed. Each electrical wiring member is connected to a terminal arranged at one end portion of the corresponding element substrate and extends in a third direction intersecting the first direction and the second direction.

12 Claims, 17 Drawing Sheets

LIQUID EJECTION HEAD, LIQUID EJECTION APPARATUS, AND EJECTION MODULE

BACKGROUND

Field of the Disclosure

The present disclosure relates to a liquid ejection head, a liquid ejection apparatus, and an ejection module.

Description of the Related Art

Generally, there is a demand for the manufacturing cost of a liquid ejection head to be reduced. In order to reduce the manufacturing cost of a liquid ejection head, an attempt has been made to downsize a liquid ejection head by downsizing the element substrate. On the other hand, in a case where downsizing of the element substrate advances further, the adhesion surface area between the element substrate and a flow path member that supplies a liquid to the element substrate is reduced, and therefore, the reliability of adhesion is reduced.

In order to secure the reliability of adhesion, a print head assembly (that is, liquid ejection head) according to the specification of U.S. Patent Application Publication No. 2005/0162468 secures the adhesion surface area by arranging rectangular print chips (that is, "element substrate") in-line.

However, in the print head assembly according to the specification of U.S. Patent Application Publication No. 2005/0162468, a plurality of types of liquid are ejected by using one print chip, and therefore, there is a possibility that nonuniformity occurs. Further, the print chip and the printed circuit board according to the specification of U.S. Patent Application Publication No. 2005/0162468 are electrically connected by a TAB film connected almost across the entire area of the long side in the print chip. Due to this, in order to seal the electrical connection portion, a sealing area for sealing the entire area of the long side in the print chip is necessary, and therefore, it is made difficult to downsize the element substrate.

Consequently, an object of the present disclosure is to provide a liquid ejection head that is compact and whose reliability of the electrical connection portion is high.

SUMMARY

In order to achieve the above-described object, the liquid ejection head according to the present disclosure is a liquid ejection head having a plurality of sets of element substrates in which a plurality of ejection elements ejecting a liquid of the same type is arrayed and a plurality of sets of electrical wiring members for supplying electric power to the element substrate, wherein each of the element substrates is arrayed in a second direction inclined with respect to a first direction in which the plurality of ejection elements is arrayed and the electrical wiring member is connected to a terminal arranged at one end portion of the element substrate and extends in a third direction intersecting the first direction and the second direction.

Further features of the present disclosure will become apparent from the following description of exemplary embodiments with reference to the attached drawings.

DESCRIPTION OF THE EMBODIMENTS

It is possible to apply a liquid ejection head, a liquid ejection apparatus, and a liquid supply method of the present disclosure to a device, such as a printer, a copy machine, a facsimile machine having a communication system, and a word processor having a printer unit, and further, to an industrial printing apparatus combined compositely with various processing devices. For example, it is also possible to use them for the purpose of biochip manufacturing, electronic circuit printing and the like.

Further, embodiments to be described in the following are appropriate specific examples of the present disclosure, and therefore, a variety of technically preferable restrictions are imposed thereon. However, as long as the concept of the present disclosure is observed, the present embodiments are not limited to the embodiments of the present specification and other specific methods.

First Embodiment

<Liquid Ejection Apparatus 10>

FIG. 1 is an outline configuration diagram of a liquid ejection apparatus 10 in the present embodiment.

In the present embodiment, the longitudinal direction of a printing unit 12 is taken to be a ±X-direction. Further, the short-side direction of the printing unit 12 is taken to be a ±Y-direction. A printing medium P is conveyed in the +Y-direction, and therefore, the +Y-direction is appropriately called "conveyance direction". Further, the direction of gravity (downward direction) is taken to be a +Z-direction and the direction (upward direction) opposite to the direction of gravity is taken to be a −Z-direction.

Figure 1A:
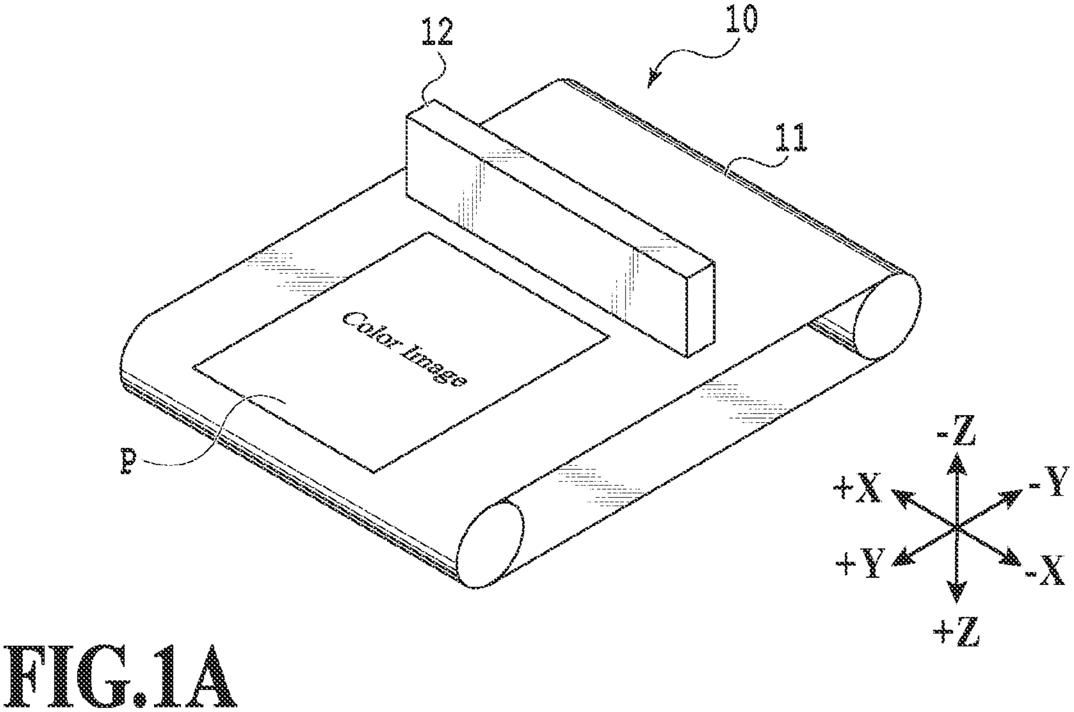
FIG. 1A and FIG. 1B are each an outline configuration diagram of a liquid ejection apparatus in one embodiment.

As shown in FIG. 1A, the liquid ejection apparatus 10 comprises a conveyance unit 11 and the printing unit 12. The conveyance unit 11 conveys the sheet-shaped printing medium P in a predetermined direction (in the present embodiment, the +Y-direction). Due to this, the printing medium P passes under the printing unit 12 (on the side in the +Z-direction) in the predetermined direction at a predetermined speed. The printing unit 12 mainly includes a liquid ejection head 100, to be described later. Further, the liquid ejection head 100 includes a plurality of ejection modules. The ejection module includes an element substrate having an ejection element column in which a plurality of ejection elements ejecting a liquid of the same type is arrayed and an electrical connection portion arranged at the end portion in the direction of the array with respect to the ejection element column. Further, the ejection module includes an electrical connection member electrically connecting to an electrical connection portion and extending in the direction intersecting the direction of the array of the ejection element column. Here, the "ejection element" is called including an ejection port in the ejection element column and an energy generation element for ejecting a liquid from the ejection port by receiving electric energy that is sent via the electrical connection member.

The liquid ejection head 100 comprises a plurality of ejection ports 201 (see FIG. 3) ejecting a liquid (for example, ink including color material) as droplets. The plurality of the ejection ports 201 is arrayed in a range corresponding to the width (length in the X-direction) of the printing medium P along the direction (the X-direction) intersecting (in the present embodiment, perpendicular to) the conveyance direction (the +Y-direction) of the printing medium P. At the time of the printing medium P passing under the liquid ejection head 100, the ejection element provided corresponding to each ejection port of the liquid ejection head 100 is driven in accordance with ejection data. Due to this, the liquid is ejected in the +Z-direction toward the printing medium P from the ejection port 201 and an image is printed. As described above, the liquid ejection apparatus 10 in the present embodiment is a full-line type printing apparatus performing printing by ejecting a liquid from an ejection element column 202 (see FIG. 3) arrayed along the width direction (the X-direction) of the printing medium P while conveying the printing medium P continuously or intermittently.

Figure 1B:
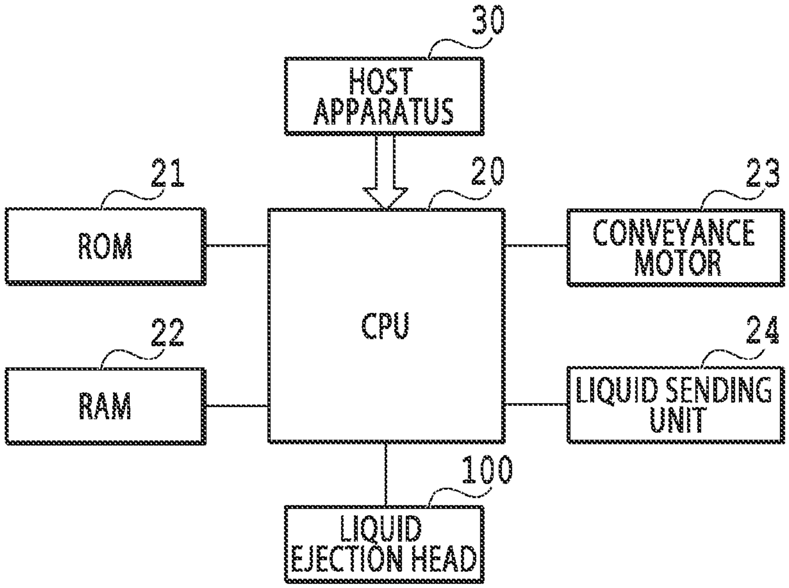

FIG. 1B is a block diagram showing the control configuration of the liquid ejection apparatus 10 in the present embodiment. The liquid ejection apparatus 10 comprises a CPU 20, a ROM 21, and a RAM 22. The CPU 20 comprehensively controls each unit of the liquid ejection apparatus 10 while using the RAM 22 as a work area in accordance with programs stored in the ROM 21. For example, the CPU 20 generates ejection data for driving the ejection element of the liquid ejection head 100 by performing predetermined image processing in accordance with programs and parameters stored in the ROM 21 for the image data received from a host apparatus 30 connected externally. The CPU 20 drives the liquid ejection head 100 in accordance with ejection data and causes a liquid to be ejected at a predetermined frequency. Further, the CPU 20 drives a conveyance motor 23 and causes the conveyance unit 11 to convey the printing medium P in the +Y-direction at a speed corresponding to the ejection frequency of the ejection operation by the liquid ejection head 100. Due to this, on the printing medium P, an image in accordance with image data received from the host apparatus 30 is printed.

Further, a liquid sending unit 24 is a unit for supplying a liquid to the liquid ejection head 100. The liquid sending unit 24 controls a pressure control unit, a switch mechanism and the like provided internally and controls the flow of the liquid in the flow path of the liquid including the liquid ejection head 100 under the management of the CPU 20. The liquid sending unit 24 may be a unit configured to function as a liquid supply unit configured to supply a liquid to the liquid ejection head 100 or may be a unit having a function as a liquid circulation unit configured to circulate a liquid in the circulation path including the liquid ejection head 100.

<Explanation of Liquid Ejection Head 100>

Figure 2:
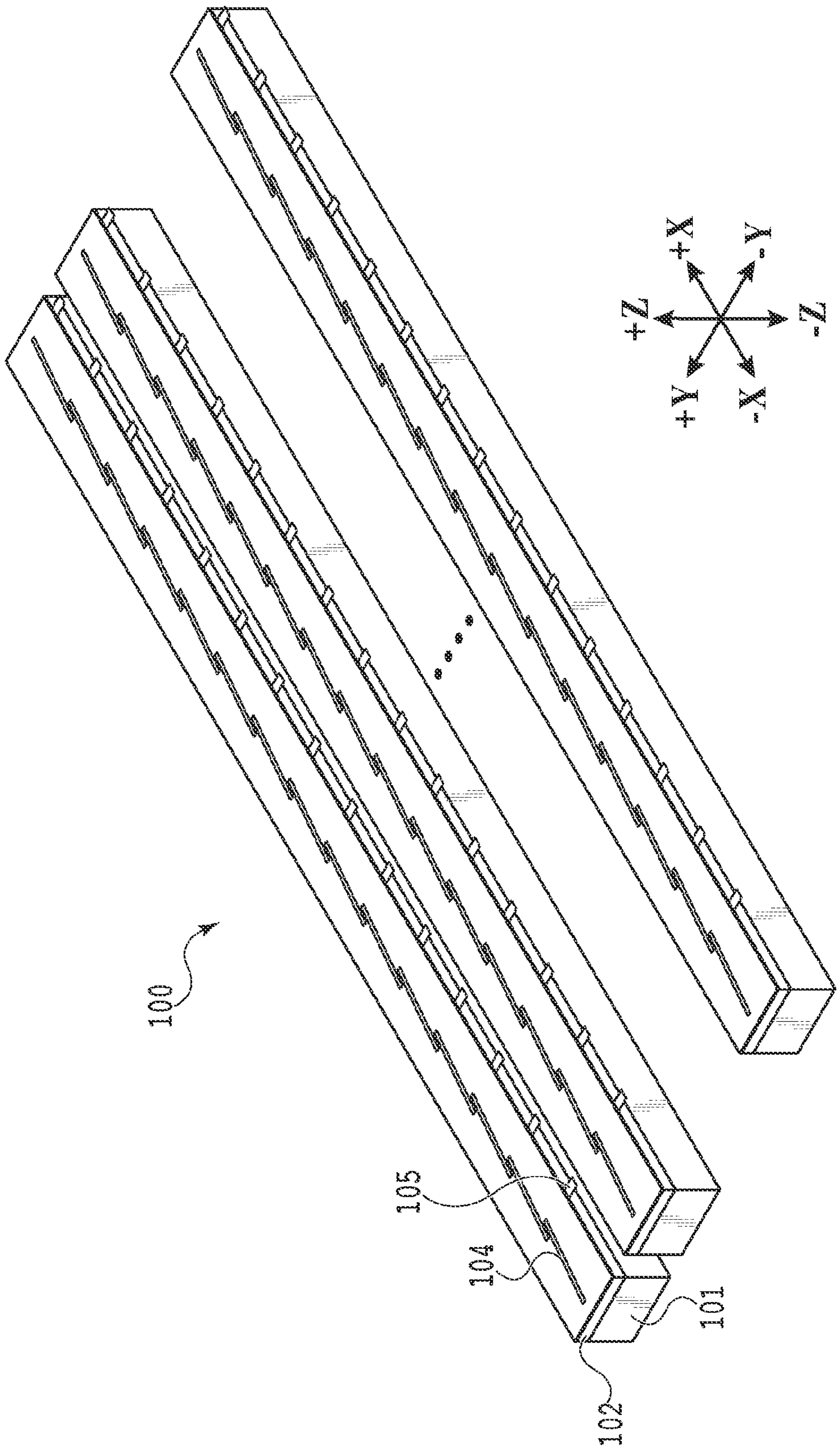
FIG. 2 is a perspective diagram schematically showing one example of a liquid ejection head in one embodiment.

FIG. 2 is a perspective diagram schematically showing one example of the liquid ejection head 100 in the present embodiment.

As shown in FIG. 2, the liquid ejection head 100 in the present embodiment comprises a first flow path member 101, a second flow path member 102, an element substrate 104, and an electrical wiring member 105. The liquid ejection head 100 is configured by laminating the first flow path member 101 and the second flow path member 102 to which the element substrate 104 to which the electrical wiring member 105 is connected electrically is attached. The first flow path member 101 and the second flow path member 102 are each a member that distributes the liquid supplied from the liquid sending unit 24 (see FIG. 1B) of the liquid ejection apparatus 10 to each element substrate 104. That is, the liquid ejection head 100 has a flow path portion in which a supply flow path that supplies a liquid to the element substrate 104 is formed.

Inside the first flow path member 101, a flow path extending in the X-direction and a flow path that communicates with the second flow path member 102 are formed in the state where the second flow path member 102 is laminated on the first flow path member 101. In the second flow path member 102, a flow path that communicates with the first flow path member 101 is formed in the state where the second flow path member 102 is laminated on the first flow path member 101. Further, in the second flow path member 102, a flow path that communicates with the second flow path member 102 is formed in the state where the element substrate 104 is attached to the second flow path member 102. Inside the first flow path member 101, a flow path extending in the X-direction is formed. By the first flow path member 101, the second flow path member 102, and the element substrate 104 being laminated in this order, a flow path that communicates with each individual printing element of the element substrate 104 from the flow path of the first flow path member 101 is formed.

On the top surface of the second flow path member 102, the 15 element substrates 104 are arrayed approximately linearly (arranged in-line) in the direction intersecting the conveyance direction. In the present embodiment, the electrical wiring member 105 electrically connected with the element substrate 104 extends toward the short-side direction (here, the −Y-direction) of the liquid ejection head 100 up to the outside of the long side of the liquid ejection head 100. As one example of the electrical wiring member 105, there is a flexible wiring substrate. For example, by designing a configuration in which the four liquid ejection heads 100 configured as described above are used and each liquid ejection head 100 ejects ink whose color is different from one another, it is possible to eject inks of four colors of YMCK (yellow, magenta, cyan, black).

Figure 3:
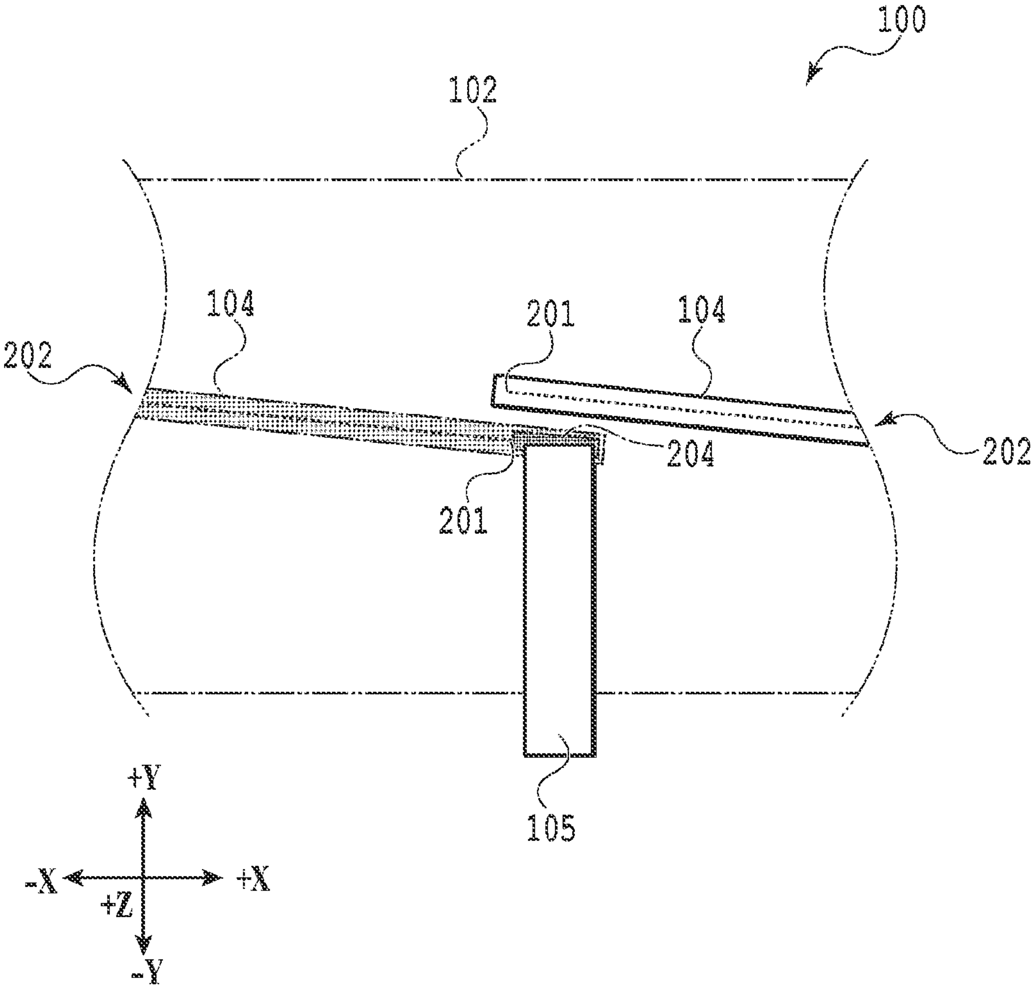
FIG. 3 is a schematic top diagram of the liquid ejection head in one embodiment.

FIG. 3 is a schematic top diagram of the liquid ejection head 100 in the present embodiment.

As shown in FIG. 3, the liquid ejection head 100 has a plurality of the element substrates 104 in which a plurality of ejection elements ejecting the same type of ink is arranged and a plurality of the electrical wiring members 105 for supplying electric power to each of the plurality of the element substrates.

The plurality of the element substrates 104 is arrayed along a predetermined direction (for example, the X-direction in FIG. 3) inclined with respect to the array direction in which the plurality of the ejection elements is arrayed. Each of the plurality of the electrical wiring members 105 is arranged at the end portion in the direction in which the plurality of the ejection elements of the element substrate 104 is arrayed and extends in the same direction (for example, the −Y-direction in FIG. 3) intersecting a predetermined direction from each of the plurality of the element substrates 104. In the present embodiment, the shape of the element substrate 104 is an approximate rectangle. The shape of the element substrate 104 may be an approximate parallelogram. However, in view of the substrate cutting process included in the manufacturing process of the element substrate 104, it is preferable for the shape of the element substrate 104 to be an approximate rectangle rather than an approximate parallelogram. On the top surface of the element substrate 104, the ejection port 201 ejecting a liquid is formed. In the following, the surface on the side on which the ejection port 201 of the element substrate 104 is formed is called "ejection surface" appropriately. The ejection element column 202 in which the plurality of the ejection ports 201 is arrayed is arranged to as to be inclined a predetermined angle with respect to the longitudinal direction (that is, the X-direction) of the liquid ejection head 100. In the following, the direction in which the ejection elements are arrayed is called "array direction".

Further, the plurality of the element substrates 104 is arrayed so as to have an area in which the two adjacent element substrates 104 overlap in a case where they are viewed from a predetermined direction toward the intersecting direction (for example, on the side in the Y-direction). For example, the ejection port 201 of the one element substrate 104 of the two adjacent element substrates 104 and the ejection port 201 of the other element substrate 104 adjacent to the former element substrate 104 are arrayed so as to overlap on the same axis line in the direction (the Y-direction) intersecting the array direction.

In the following, an area in the array direction is called "link portion" in which the ejection element columns of the two adjacent element substrates among the plurality of the element substrates overlap each other on the same axis line in the direction (for example, the Y-direction) intersecting the direction of the ejection element column. On the other hand, an area in the X-direction is called "non-link portion" in which the ejection element columns of the two adjacent element substrates do not overlap each other on the same axis line in the Y-direction.

Further, on the side further closer to the front edge in the array direction (on the side in the +X-direction), an electrical connection portion 204 is provided. That is, the electrical connection portion 204 is provided on the side further closer to the front edge in the array direction than the ejection port arranged at the end portion in the array direction in which the plurality of ejection ports is arrayed. At the electrical connection portion 204, a plurality of terminals is arranged along the array direction. Each terminal is electrically connected with the main body of the liquid ejection apparatus 10 via the electrical wiring member 105. Each terminal may be arrayed along the X-direction as long as the terminal can connect with the electrical wiring member 105 electrically. The electrical wiring member 105 electrically connects with the electrical connection portion 204 of each element substrate 104 and extends in the direction intersecting the array direction. Each element substrate 104 is connected electrically with an electrical wiring substrate (not shown schematically) included in the printing unit 12 via the electrical wiring member 105.

Figure 4:
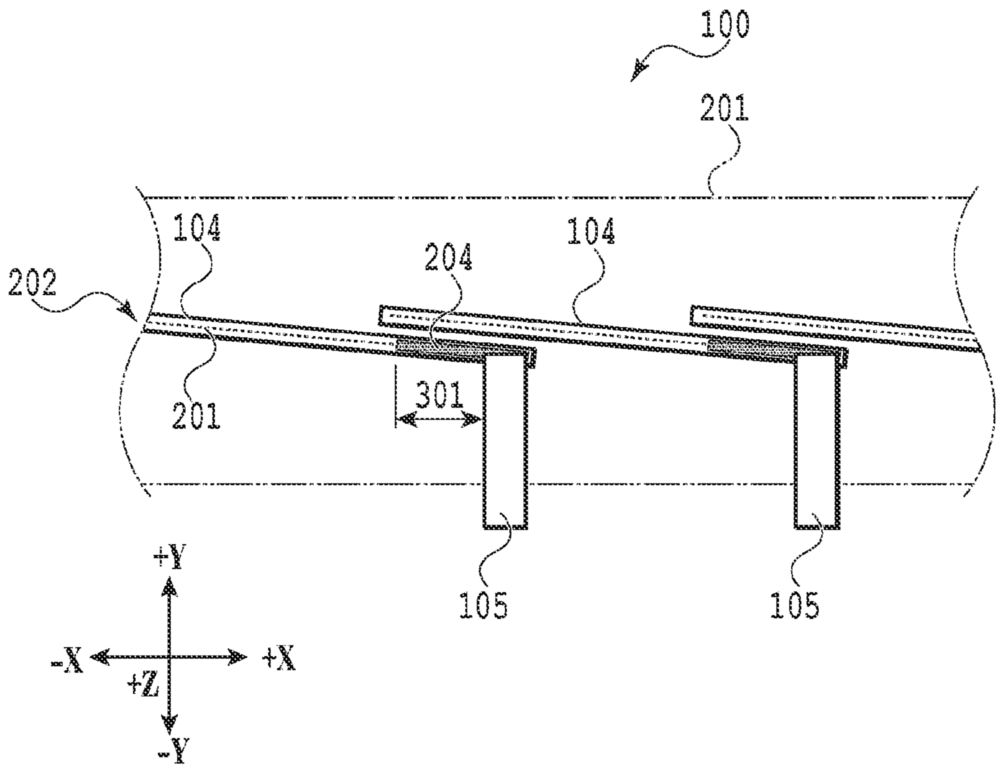
FIG. 4 is a diagram explaining an effect of reliability of electrical connection between an element substrate and an electrical wiring member in one embodiment.

FIG. 4 is a diagram explaining the effect of reliability of the electrical connection between the element substrate 104 and the electrical wiring member 105 in the present embodiment.

As shown in FIG. 4, each electrical wiring member 105 extends from the terminal arranged at each electrical connection portion 204 provided on the ejection surface of each element substrate 104 to the outside of the long side of the liquid ejection head 100 toward the short-side direction (in the example shown in FIG. 4, the −Y-direction) of the liquid ejection head 100.

Here, in order to implement electrical connection of high reliability, it is preferable to arrange the electrical connection portion 204 at a position distant to a certain extent from the ejection element column 202 in the array direction of the ejection elements for the purpose of preventing electrical interference. According to the configuration such as this, even in a case where a distance 301 from the ejection element column 202 to the electrical connection portion of the element substrate 104 and the electrical wiring member 105 increases, it is possible to reduce the influence that is exerted on the area of the element substrate 104 compared to that in a comparative example, to be described later.

Comparative Example

In the following, in order to make easy understanding of the electrical connection in the present embodiment, explanation is given by showing two comparative examples in which the conditions necessary for the present disclosure are not satisfied. Explanation of the configuration the same as or corresponding to the configuration in the present embodiment is omitted appropriately and different points are explained mainly.

Figure 5:
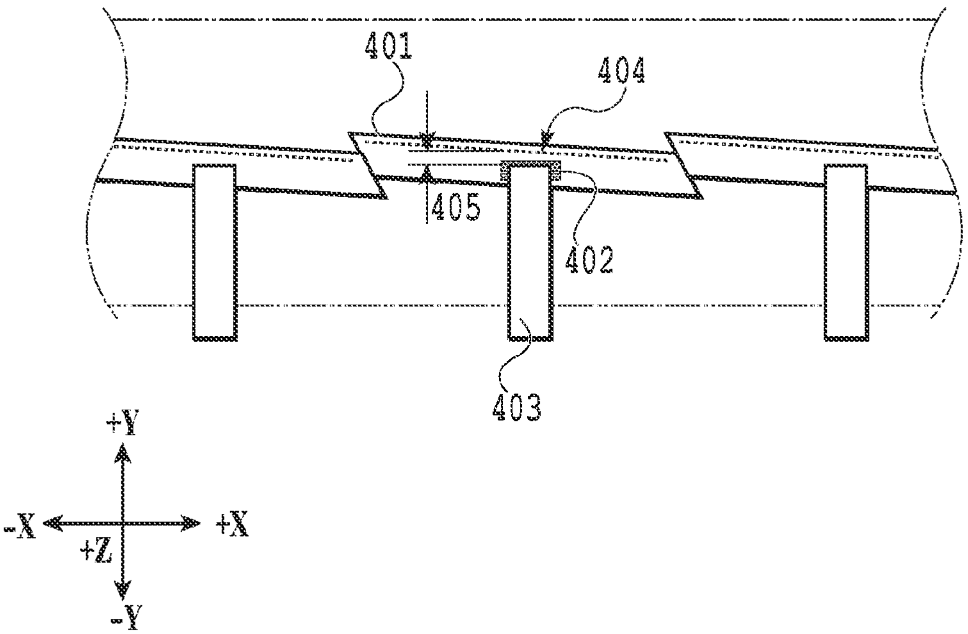
FIG. 5 is a diagram explaining an effect of reliability of electrical connection between an element substrate and an electrical wiring member in one comparative example.

FIG. 5 is a diagram showing an example in which the electrical connection portion is not arranged at the end portion in the array direction.

As shown in FIG. 5, the present comparative example differs from the present embodiment in that the shape of an element substrate 401 is an approximate parallelogram. In the present comparative example, by arranging the element substrate 401 whose shape is an approximate parallelogram in the X-direction, the array direction is inclined with respect to the X-direction.

Further, the comparative example differs from the present embodiment also in that an electrical connection portion 402 is provided substantially at the center in the longitudinal direction of the element substrate 401. Consequently, an electrical wiring member 403 is also attached substantially to the center in the longitudinal direction of the element substrate 401.

In the configuration such as this, in a case where an attempt is made to secure a distance 405 from an ejection element column 404 to the electrical connection portion 402, it is necessary to increase the length of the element substrate 401 in the short-side direction (the Y-direction). That is, the area of the element substrate 401 in the comparative example becomes larger than the area of the element substrate 104 (see FIG. 4) in the present embodiment. Consequently, with the configuration of the present comparative example, it becomes difficult to achieve both downsizing of the element substrate and reliability of the electrical connection compared to the present embodiment.

Figure 6:
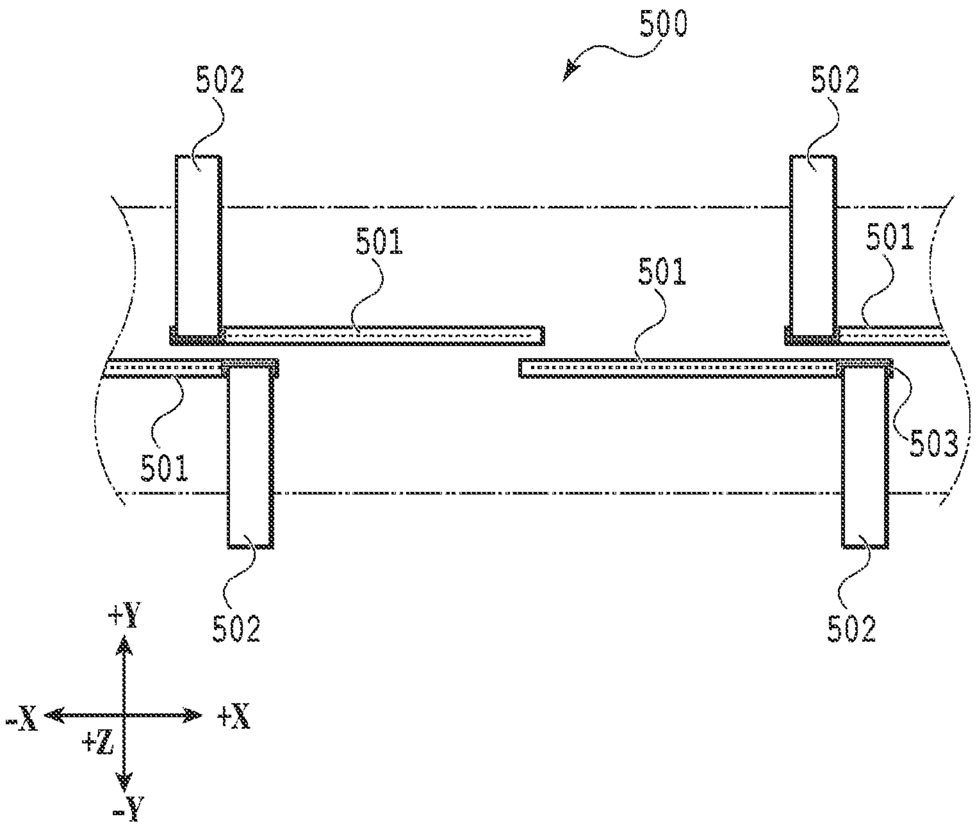
FIG. 6 is a diagram explaining an effect of reliability of electrical connection between an element substrate and an electrical wiring member in one comparative example.

FIG. 6 is a diagram showing an example in which the element substrate is arranged without inclining the element substrate in the array direction.

As shown in FIG. 6, this example differs from the present embodiment in that each ejection port is arrayed without being inclined with respect to the longitudinal direction of each element substrate 501. In a case where an electrical wiring member 502 is extended in the direction intersecting the array direction in the state where each ejection port is arrayed without being inclined with respect to the longitudinal direction of each element substrate 501, it is necessary to arrange each element substrate 501 in a staggered pattern in order to secure an area in which a link portion is provided. In a case where each element substrate 501 is arranged in a staggered pattern, on a condition that an attempt is made to extend all the electrical wiring members 502 in the same direction (for example, the −Y-direction), the electrical wiring member of the one element substrate of the two adjacent element substrates interferes with the other element substrate. For example, in a case where the orientation of the second element substrate from the left in FIG. 6 is reversed, the electrical wiring member 502 of the second element substrate physically hits the third element substrate from the left in FIG. 6.

In order to avoid such a situation, it is necessary to arrange each element substrate 501 so that the electrical wiring member 502 of each element substrate 501 extends alternately in the opposite directions (the +Y-direction and the −Y-direction). In this case, it is necessary to further install an electrical wiring substrate (not shown schematically) that electrically connects with the electrical wiring member 502 also on the side in the +Y-direction, in addition to the side in the −Y-direction, and therefore, the manufacturing cost will increase. The above is the explanation of the electrical connection in the comparative example. In the following, explanation is returned to the present embodiment.

<Suppression Effect of Nonuniformity>

Figure 7:
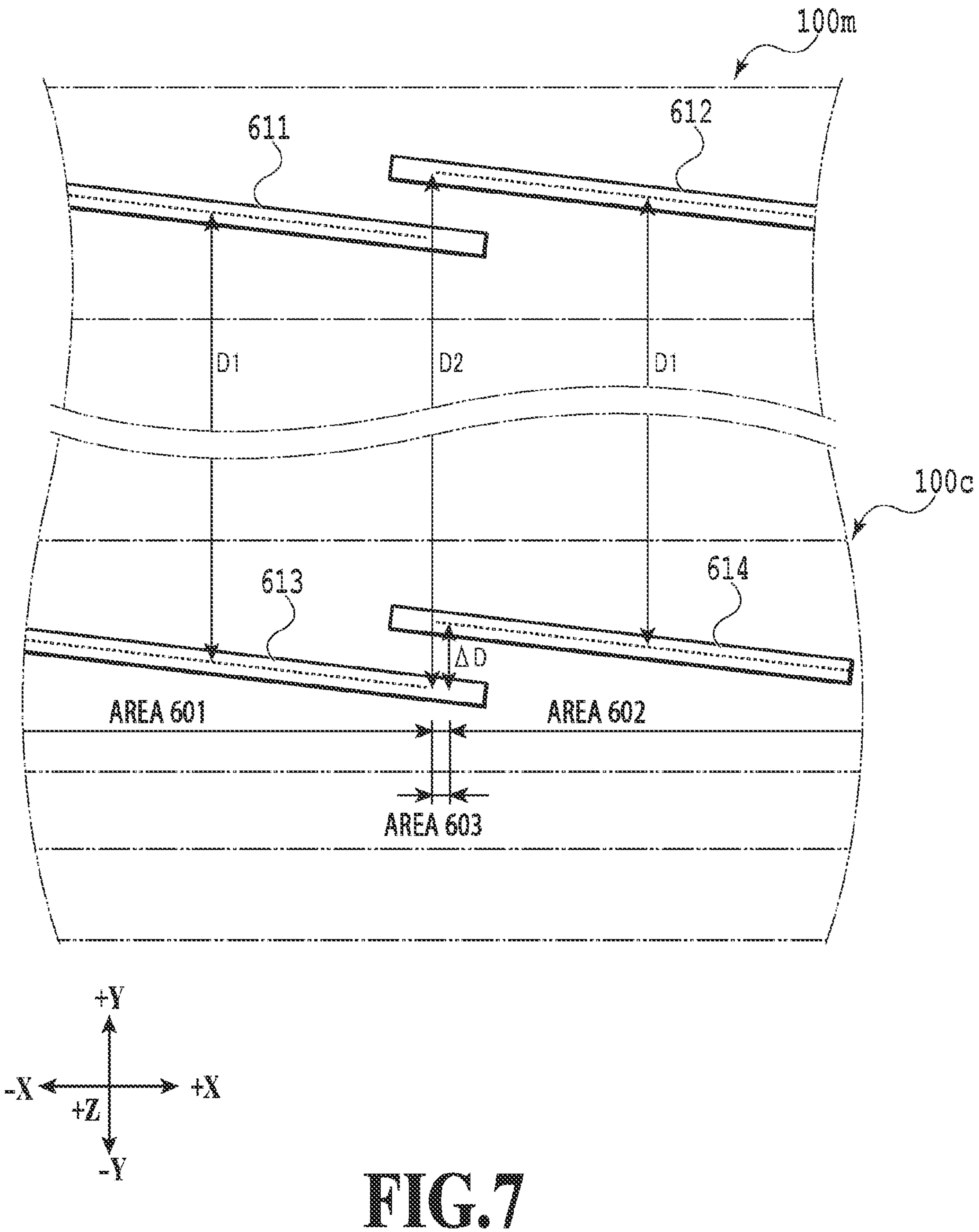
FIG. 7 is a diagram explaining an effect of a liquid ejection head suppressing nonuniformity in one embodiment.

FIG. 7 is a diagram explaining the effect by the liquid ejection head in the present embodiment suppressing nonuniformity. Here, for convenience of explanation, explanation is given in the state where the electrical wiring member is removed from the element substrate. Further, explanation is given by calling the liquid ejection head that ejects the magenta ink of the plurality of the liquid ejection heads 100 shown in FIG. 2 a first liquid ejection head 100*m* and the liquid ejection head that ejects the cyan ink a second liquid ejection head 100*c*. Then, explanation is given by calling an element substrate adjacent to a first element substrate 611 of the first liquid ejection head 100*m* a second element substrate 612. Explanation is given by calling an element substrate adjacent to a third element substrate 613 of the second element substrate 100*c* a fourth element substrate 614.

Further, as described above, also in FIG. 7, the ejection element columns on the two adjacent element substrates are configured so that at least one ejection port overlaps another in the conveyance direction (the Y-direction) of a printing medium. For example, "area 601" and "area 602" shown schematically are each "non-link portion" and "area 603" is "link portion".

Further in FIG. 7, "D1" indicates a distance between two ejection element columns in "non-link portion", which eject different color inks. For example, the distance in the conveyance direction from the ejection element column of the first element substrate 611 in the area 601, which is "non-link portion", to the ejection element column of the third element substrate 613 is "D1". Similarly, the distance in the conveyance direction from the ejection element column of the second element substrate 612 in the area 602, which is "non-link area", to the ejection element column of the fourth element substrate 614 is also "D1".

On the other hand, "D2" indicates the longest distance between the two ejection element columns in "link portion", which eject different color inks. For example, the distance in the conveyance direction from the ejection element column of the second element substrate 612 in the area 603, which is "link portion", to the ejection element column of the third element substrate 613 is "D2". Then, the distance in the conveyance direction between the two adjacent ejection element columns in "link portion", which eject the same color ink, is "ΔD". For example, the distance in the conveyance direction from the ejection element column of the third adjacent element substrate 613 to the ejection element column of the fourth element substrate 614 in "link portion" 603 is "ΔD", both ejecting the cyan ink.

As shown in FIG. 7, the plurality of the element substrates 104 is configured including an area in which the ejection element columns on the two adjacent element substrates 104 overlap each other in the direction (for example, the Y-direction in FIG. 7) intersecting a predetermined direction (for example, the X-direction in FIG. 7).

Specifically, the first liquid ejection head 100*m* and the second liquid ejection head 100*c* are arranged in the conveyance direction (that is, the Y-direction). The first element substrate 611 and the second element substrate 612 of the first liquid ejection head 100*m* are arranged so as to be inclined a predetermined angle with respect to the longitudinal direction (that is, the X-direction) of the first liquid ejection head 100*m*. Similarly, the third element substrate 613 and the fourth element substrate 614 of the second liquid ejection head 100*c* are arranged so as to be inclined a predetermined angle with respect to the longitudinal direction (that is, the X-direction) of the second liquid ejection head 100*c*.

Generally, there is a trend for the distance between "non-link portions" (that is, the distance "D1") of the two liquid ejection heads ejecting inks whose colors are different from each other to become large. On the other hand, in "non-link portion", there is a trend for the distance from the ejection element column of the element substrate to the ejection element column of the element substrate adjacent to the former element substrate (that is, the distance "ΔD") to become small compared to the distance between "non-link portions" (that is, the distance "D1").

Consequently, in the present embodiment, two formulas below hold.

$$\Delta D \ll D1 \quad \text{formula (1)}$$

$$D2 = D1 + \Delta D \quad \text{formula (2)}$$

Here, by taking into consideration "formula (1)" and "formula (2)", it is possible to express the distance in the conveyance direction between the ejection element columns ejecting inks whose colors are different from each other (that is, "D2") in "link portion" by using a formula below.

$$D2 \approx D1 \quad \text{formula (3)}$$

That is, both in "link portion" and in "non-link portion", the distances between the two ejection element columns ejecting inks whose colors are different from each other (corresponding to D2 and D1, respectively) are substantially equal. That is, the time from the provision of the cyan ink to the provision of the magenta ink to the printing medium that is conveyed at a constant speed in the +Y-direction is not largely different between "link portion" and "non-link portion".

Consequently, according to the liquid ejection head in the present embodiment, the nonuniformity due to the time difference is not conspicuous in a case where secondary color inks are ejected in "non-link portion" and "link portion". As described above, according to the technique of the present disclosure, it is possible to provide a liquid ejection head in which the element substrate has been downsized in the state where the occurrence of nonuniformity is suppressed.

Comparative Example

In the following, in order to explain the effect of nonuniformity suppression in the present embodiment, explanation is given by showing two comparative examples. Explanation of the configuration the same as or corresponding to the configuration in the present embodiment is omitted appropriately and different points are explained mainly.

Figure 8:
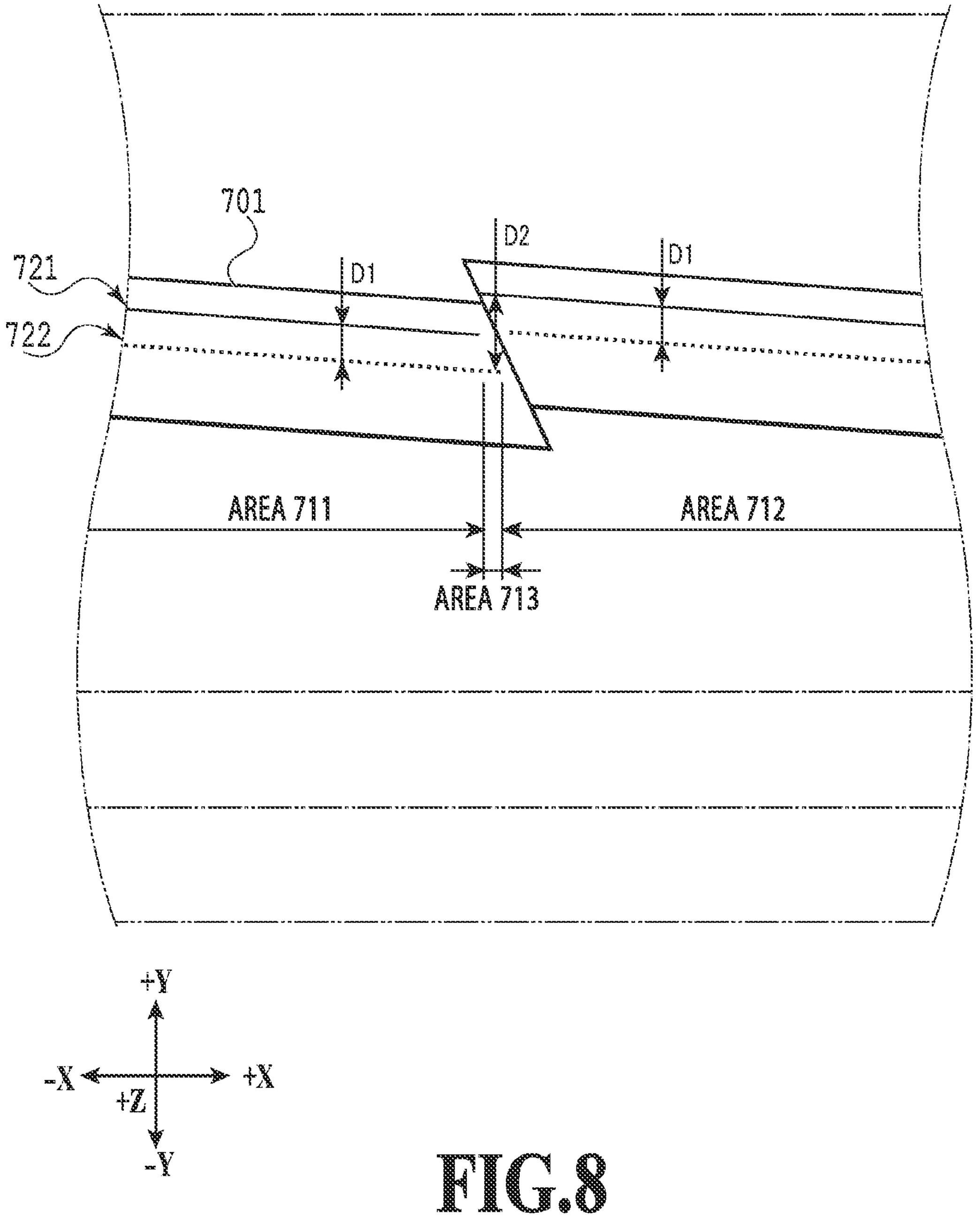
FIG. 8 is a diagram explaining an effect of nonuniformity suppression in one comparative example.

FIG. 8 is a diagram explaining the effect of nonuniformity suppression in a third comparative example.

As shown in FIG. 8, the third comparative example differs from the present embodiment in that the shape of an element substrate 701 is an approximate parallelogram and ejection element columns corresponding to two colors are arranged on one element substrate. Further, the third comparative example differs from the present embodiment in that the one element substrate 701 comprises an ejection element column 721 and an ejection element column 722 and each ejection element column ejects an ink whose color is different from each other. In the present comparative example, the distance (distance indicated by "D1" in FIG. 8) between the ejection element columns in "non-link portion" (area 711 and area 712) and the distance (distance indicated by "D2" in FIG. 8) between the ejection element columns in "link portion" (area 713) are different. That is, the difference between D1 and D2 is not small and the distance between the ejection element columns ejecting inks whose colors are different is not equal in "non-link portion" and "link portion". That is, the time difference from the provision of ink by the ejection element column 722 to the provision of ink by the ejection element column 721 to the printing medium that is conveyed at a constant speed in the +Y-direction is different between "link portion" and "non-link portion". Consequently, with the configuration of the present comparative example, the nonuniformity due to the time difference of the secondary colors becomes conspicuous in "non-link portion" and "link portion". For example, it is assumed that the magenta ink is ejected from the ejection element column 721 and following this, the cyan ink is ejected from the ejection element column 722 in this order. In this case, at the time of the ink landing onto the printing medium, the permeation speed to printing medium is different between the colors, and therefore, there is a possibility that beading occurs and nonuniformity is caused.

Figure 9:
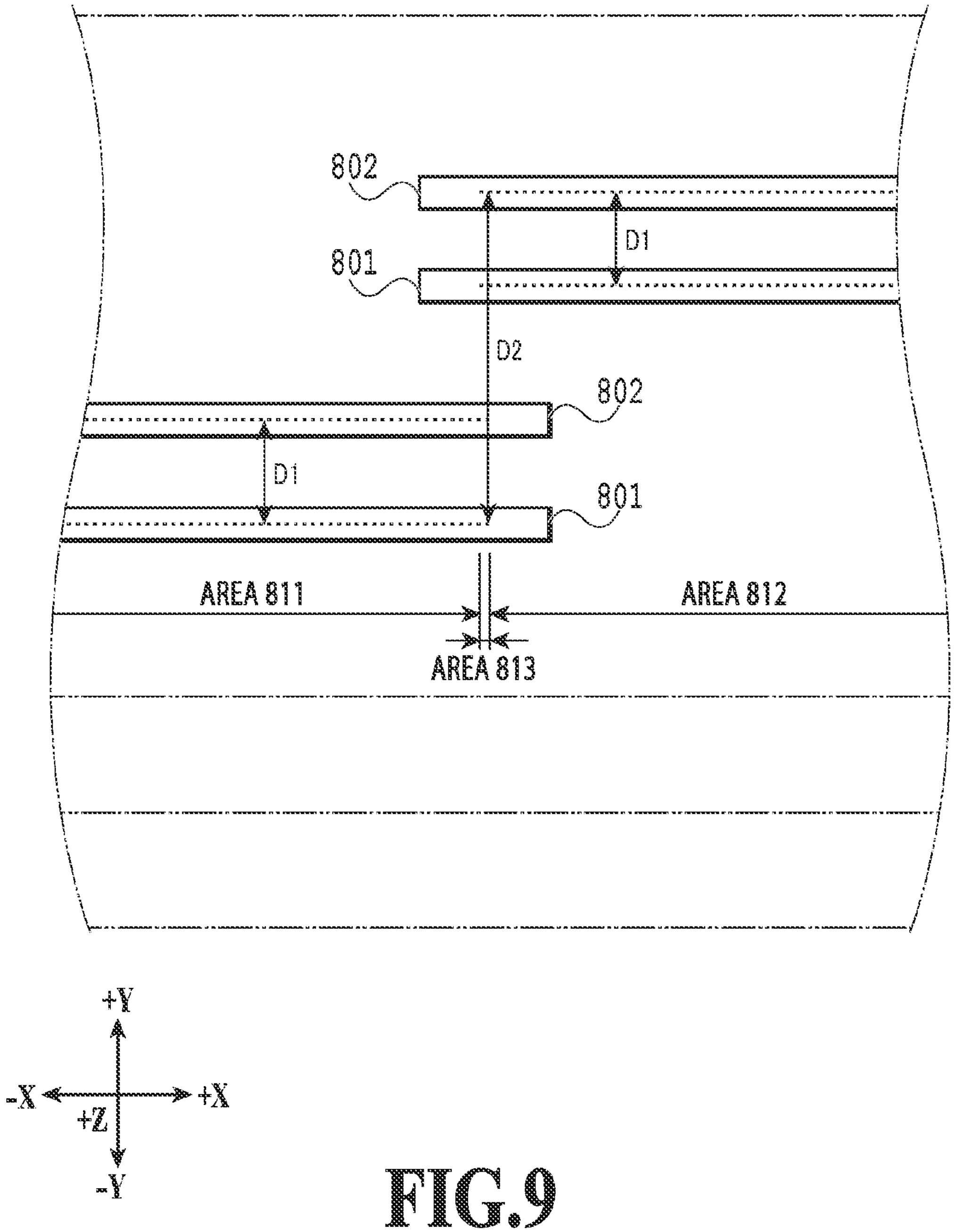
FIG. 9 is a diagram explaining an effect of nonuniformity suppression in one comparative example.

FIG. 9 is a diagram explaining the effect of nonuniformity suppression in a fourth comparative example.

As shown in FIG. 9, the present comparative example differs from the present embodiment in that two element substrates ejecting inks whose colors are different from each other are arranged in a staggered manner as one set of element substrate group. For example, it is assumed that the cyan ink is ejected from a fifth element substrate 801 and the magenta ink is ejected from a sixth element substrate 802. In the configuration such as in the present comparative example also, the distance between the ejection element columns ejecting inks whose colors are different from each other in "non-link portion" and the distance between the ejection element columns ejecting inks whose colors are different from each other in "link portion" are no longer equal. That is, the distance "D1" between the ejection element columns ejecting inks whose colors are different from each other in an area 811 and an area 812 and the distance "D2" between the ejection element columns ejecting inks whose colors are different from each other in an area 813 are no longer equal.

Consequently, according to the configuration such as in the present comparative example, the nonuniformity due to the time difference in a case where the secondary color inks are ejected becomes conspicuous in "non-link portion" and "link portion".

<Conclusion>

As explained above, by arranging the ejection element columns so that the distance from the ejection element column ejecting a liquid to the ejection element column ejecting a liquid whose color is different from that of the former ejection element column is equal in "link portion" and "non-link portion", it is possible to suppress nonuniformity due to the time difference in a case where a liquid is ejected.

In the present embodiment, explanation is given by taking magenta and cyan as an example of ink colors. For example, in a case where inks whose number of colors is more (generally, four colors of YMCK and more) are used, there is a possibility that the influence of nonuniformity due to the time difference in a case where a liquid is ejected becomes more conspicuous. Because of this, the configuration such as in the present embodiment becomes more effective.

Further, as described above, by arranging each electrical wiring member 105 on the side further closer to the front edge in the array direction and extending the electrical wiring member 105 to the outside of the long side of the liquid ejection head 100 in the same direction, it is also possible to achieve both downsizing of the element substrate 104 and reliability of the electrical connection.

Consequently, according to the technique of the present disclosure, it is possible to provide a liquid ejection head that is compact and whose reliability is high.

Application Example

Generally, in a case of a line head implementing a desired print width by arranging an element substrate inclined with respect to the conveyance direction, it is desirable for the distance in the conveyance direction in "link portion" from an ejection element column to another ejection element column ejecting ink whose color is different from that of the former ejection element column to be small. The reason is that the smaller the distance in the conveyance direction in "link portion" from the ejection element column to another ejection element column ejecting ink whose color is different from that of the former ejection element column, the more it is possible to suppress the occurrence of an air flow. In the following, a relationship between the distance in the link portion and the inclination of the element substrate is explained by using FIG. 10 and FIG. 11.

<Relationship Between Distance Between Two Adjacent Element Substrates and Inclination>

Figure 10:
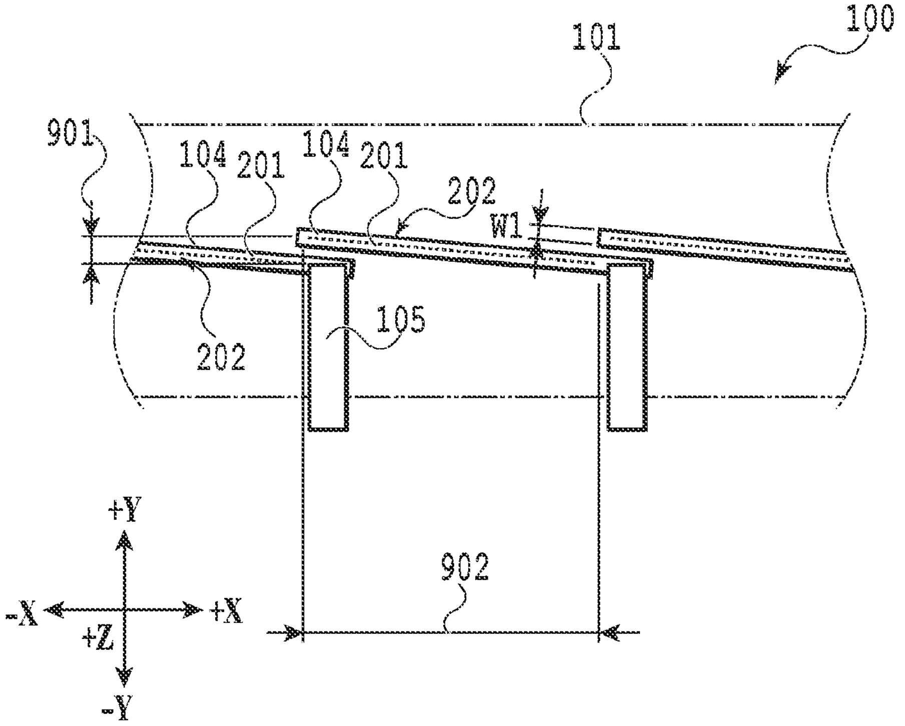
FIG. 10 is a diagram for explaining an application example of one embodiment.

FIG. 10 is a diagram for explaining an application example of the present embodiment.

As shown in FIG. 10, in a case where a plurality of the element substrates 104 ejecting the same color ink is arranged in-line in close proximity to one another, the air flow that flows in accompanying the conveyance of a printing medium is blocked by the air flow accompanying the ejection of ink from each ejection port 201. Because of this, the smaller the distance between the ejection element columns on the two adjacent element substrates 104 in "link portion", the more unlikely the air flow accompanying the conveyance of a printing medium flows in. That is, the shorter a distance 901 shown in FIG. 10, the more the air flow accompanying the conveyance of a printing medium is suppressed. As a result of that, in "link portion" in this case, the amount of the air flow accompanying the conveyance of a printing medium becomes small, and therefore, the position error of a liquid droplet ejected from each ejection port 201 is also suppressed.

In the following, for convenience of explanation, explanation is given by calling an element substrate on the left side in FIG. 10 among three element substrates shown in FIG. 10 a first element substrate and an element substrate at the center in FIG. 10 adjacent to the first element substrate a second element substrate. For example, it is preferable for the distance in a direction perpendicular to a predetermined direction between a first ejection element on the first element substrate and a second ejection element on the second element substrate, which is arranged at the same position as that of the first ejection element in the predetermined direction, to be 2.6 mm or less. That is, it is preferable for the distance in the Y-direction perpendicular to the X-direction between the first ejection element on the first element substrate and the second ejection element on the second element substrate, which is arranged at the same position as that of the first ejection element in the X-direction, to be 2.6 mm or less. According to the configuration such as this, it is possible to suppress the occurrence of the air flow due to the conveyance of a printing medium.

Comparative Example

In the following, in order to explain a relationship between the distance between two adjacent element substrates and the inclination in the present embodiment, explanation is given by showing a comparative example. Explanation of the configuration the same as or corresponding to the configuration in the present embodiment is omitted appropriately and different points are explained mainly.

Figure 11:
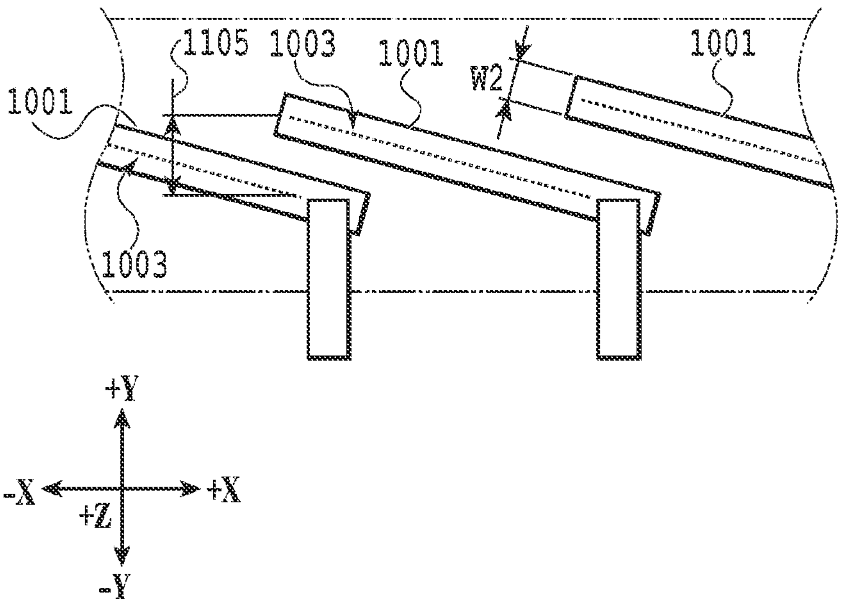
FIG. 11 is a diagram for explaining one comparative example.

FIG. 11 is a diagram for explaining a fifth comparative example.

As shown in FIG. 11, in the present comparative example, a plurality of element substrates 1001 is arranged more inclined (so that the inclination angle becomes closer to 90 degrees) than in the case of the application example shown in FIG. 10. Further, the distance between the two adjacent element substrates 1001 is longer than that in the application example shown in FIG. 10. Due to this, in the present comparative example, the distance (distance 1105 show in FIG. 11) from an ejection element column 1003 of the element substrate 1001 to the ejection element column 1003 of the element substrate 1001 adjacent to the former element substrate 1001 is longer than that in the application example in FIG. 10. Then, between the two adjacent ejection element columns, the air flow due to the conveyance of a printing medium becomes more likely to occur. As a result of that, the amount of the air flow that flows in between the two adjacent ejection element columns in "link portion" becomes larger than that in the application example in FIG. 10, and therefore, the degree of the position error of a liquid droplet ejected from the ejection port also increases. Consequently, in order to suppress the position error of a liquid droplet due to the air flow having flowed into "link portion", it is important to make the two adjacent ejection element columns closer to each other in "link portion".

Here, explanation of the application example of the present embodiment is continued by returning to FIG. 10. In order to make the plurality of the ejection element columns 202 ejecting the same color ink closer to one another as shown in FIG. 10, it is recommended to reduce the angle at which the element substrate 104 is arranged (so that the angle becomes closer to 0 degrees).

As described above, the plurality of the element substrates 104 is arrayed along a predetermined direction (for example, the X-direction in FIG. 10) inclined with respect to the array direction in which the plurality of ejection elements is arrayed. As one example, in a case where the print width (that is, the length in the longitudinal direction of the element substrate 104) is 0.85 in., which is the general length, the predetermined direction (the X-direction in FIG. 10) is inclined about 7 degrees with respect to the array direction. That is, the element substrate 104 is arranged inclined about 7 degrees with respect to the X-direction in FIG. 10. As described above, by arranging the plurality of the element substrates 104 inclined, it is possible to make the plurality of the ejection element columns 202 ejecting the same color ink closer to one another.

Further, in that case, in order to suppress the two adjacent element substrates 104 from interfering with each other, it is recommended to reduce the length in the direction intersecting the array direction of the element substrate 104. For example, it is recommended to design a configuration so that the length in the direction intersecting the array direction of the element substrate 104 is 1.5 mm or less. More specifically, in a case where the shape of the element substrate 104 is an approximate rectangle, it is preferable for a configuration to be designed so that the length of the short side of the element substrate 104 is 1.5 mm or less. That is, it is preferable for a configuration to be designed so that a width w1 of the element substrate 104 is less than a width w2 (see FIG. 11) of the element substrate 1001.

Further, by downsizing the element substrate 104, it is also possible to reduce the manufacturing cost of the element substrate 104, in addition to the suppression of the occurrence of the air flow due to the conveyance of a printing medium. The larger the distance (the distance 901 in FIG. 10) from the ejection element column 202 of the element substrate 104 to the ejection element column 202 of the element substrate 104 adjacent to the former element substrate 104, the larger the inclination of the element substrate 104 is. Consequently, the larger the distance from the ejection element column 202 of the element substrate 104 to the ejection element column 202 of the element substrate 104 adjacent to the former element substrate 104, the more the length of the element substrate 104 for an effective print length 902 increases. That is, the manufacturing cost of the element substrate 104 increases by an amount corresponding to the increase in the length of the element substrate 104.

Further, also from the viewpoint of downsizing the element substrate 104, it is preferable for the distance from the ejection element column 202 of the element substrate 104 to the ejection element column 202 of the element substrate 104 adjacent to the former element substrate 104 to be small. In addition, it is important to arrange the ejection element columns highly densely or to increase the number layers of wiring in order to downsize the circuit area occupying the element substrate 104.

According to the technique of the present disclosure, it is possible to provide an element substrate that is compact and whose reliability of the electrical connection portion is high. Then, it is possible to provide a liquid ejection head that is compact and whose nonuniformity has been suppressed. That is, according to the technique of the present disclosure, it is possible to provide an element substrate and a liquid ejection head that are compact and whose reliability is high.

Second Embodiment

In the present embodiment, a liquid ejection head having a function to circulate a one-color liquid is explained. In the following, explanation of the configuration the same as or corresponding to the configuration of the first embodiment is omitted by using the same name and the same symbol and different points are explained mainly.

Figure 12:
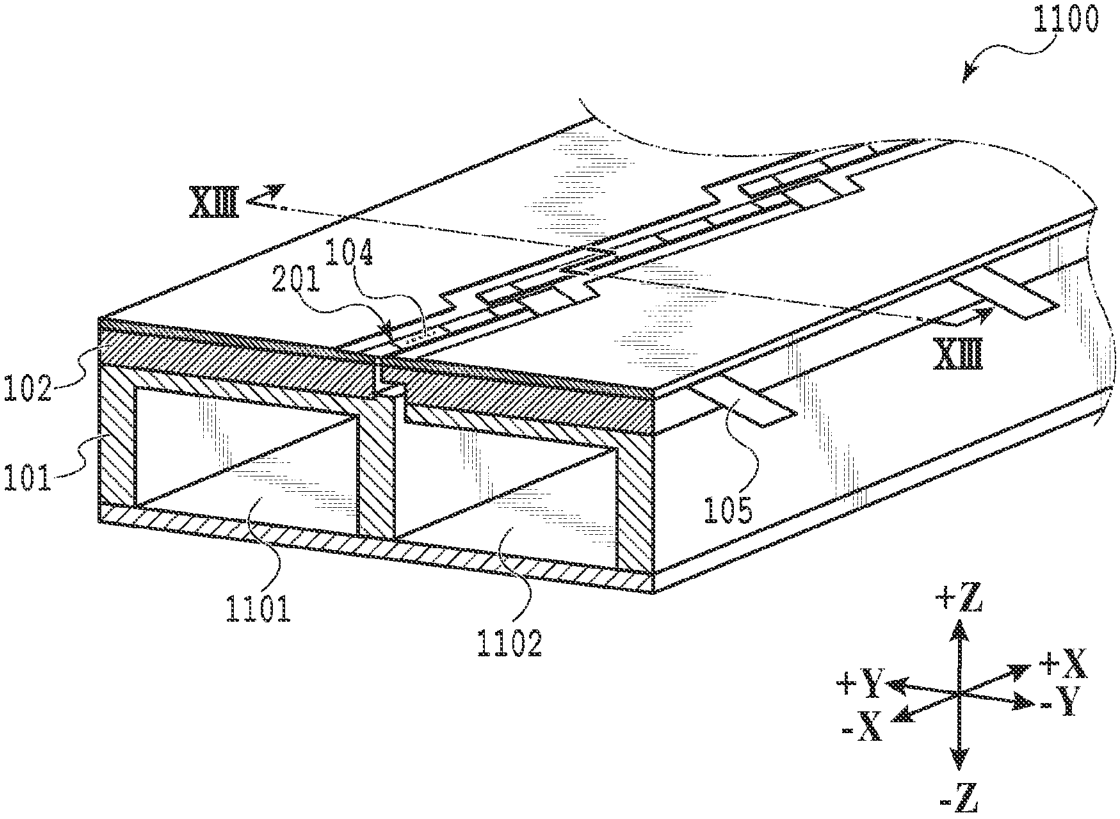
FIG. 12 is a perspective diagram schematically showing a cross section of a liquid ejection head in one embodiment.

FIG. 12 is a perspective diagram schematically showing a cross section of a third liquid ejection head 1100 in a second embodiment.

As shown in FIG. 12, in the first flow path member 101 in the third liquid ejection head 1100, a supply flow path 1101 through which the liquid flows in a case where the liquid is ejected and a collection flow path 1102 through which the liquid that has not been ejected flows in a case where the liquid is collected are formed. That is, in the flow path portion in the present embodiment, the collection flow path that collects a liquid that has not been ejected from the ejection element is formed.

Figure 13:
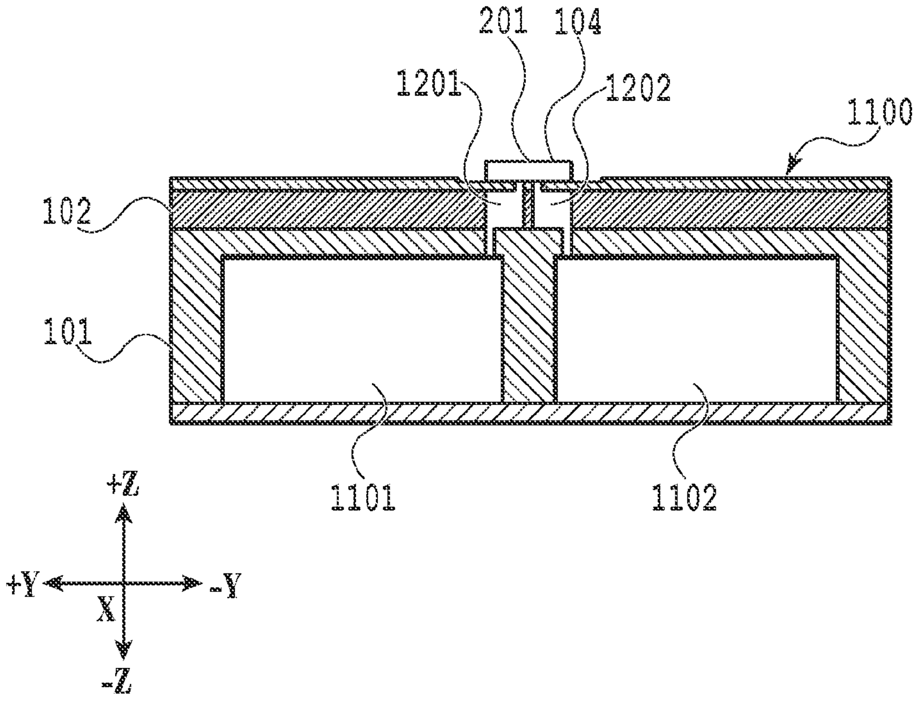
FIG. 13 is a cross-sectional diagram along a XIII-XIII line in FIG. 12.

FIG. 13 is a cross-sectional diagram along a XIII-XIII line in FIG. 12.

As shown in FIG. 13, the third liquid ejection head 1100 in the present embodiment comprises a first connection flow path 1201 that causes the supply flow path 1101 and the element substrate 104 to communicate with each other in the state where the first flow path member 101 and the second flow path member 102 are laminated. Similarly, the third liquid ejection head 1100 comprises a second connection flow path 1202 that causes the element substrate 104 and the collection flow path 1102 to communicate with each other.

In a case where the ejection operation of a liquid is performed, the liquid flows through the supply flow path 1101 and the first connection flow path 1201 in this order and is ejected from the ejection port 201 of the element substrate 104. However, there is a case where the entire liquid supplied to the element substrate 104 is not ejected from the ejection port 201. The liquid that is not ejected from the ejection port 201 flows to the collection flow path 1102 via the second connection flow path 1202. For example, by this flow, it is possible to collect the thickened ink, the air bubble and the like that occur due to evaporation from the ejection port 201 not in the ejection operation to the collection flow path 1102. Further, it is also possible to suppress the ink at the ejection port 201 from thickening. The liquid collected to the collection flow path 1102 is collected to the collection path of the main body of the liquid ejection apparatus. That is, in the present embodiment, the liquid circulates between the main body of the liquid ejection apparatus and the third liquid ejection head 1100.

Generally, in a case where ink circulation is performed, an ink including a solid component and whose density is high is ejected frequently. Because of this, generally, there is a trend for the pigment, emulsion and the like to increase. In that case, the agglomeration of the ink on a printing medium is more likely to change than the conventional ink, and therefore, there is a possibility that the nonuniformity due to the time difference is likely to become conspicuous in "non-link portion" and "link portion".

Then, accompanying the increase in the solid component, such as the pigment and emulsion, solidification of the ink on the ejection surface is likely to occur, and therefore, there is a case where a liquid that dissolves the sticking matter is attached at the time of a wipe or the like. Because of this, in the present embodiment also, it is preferable to arrange the end portion of the ejection element column and the terminal of the electrical connection portion so that they are distant from each other in the array direction. By increasing the distance from the front edge of the ejection element column to the terminal of the electrical connection portion in the array direction, more reliability is obtained.

Consequently, even in a case where the liquid ejection head has the circulation function, the configuration is effective in which each electrical wiring member is arranged on the side further closer to the front edge in the array direction and extended to the outside of the long side of the liquid ejection head in the same direction. That is, according to the technique of the present disclosure, it is possible to provide an element substrate and a liquid ejection head that are compact and whose reliability is high.

Comparative Example

In the following, in order to explain the effect of circulation in the present embodiment, explanation is given by showing a comparative example. Explanation of the configuration the same as or corresponding to the configuration in the present embodiment is omitted appropriately and different points are explained mainly.

Figure 14:
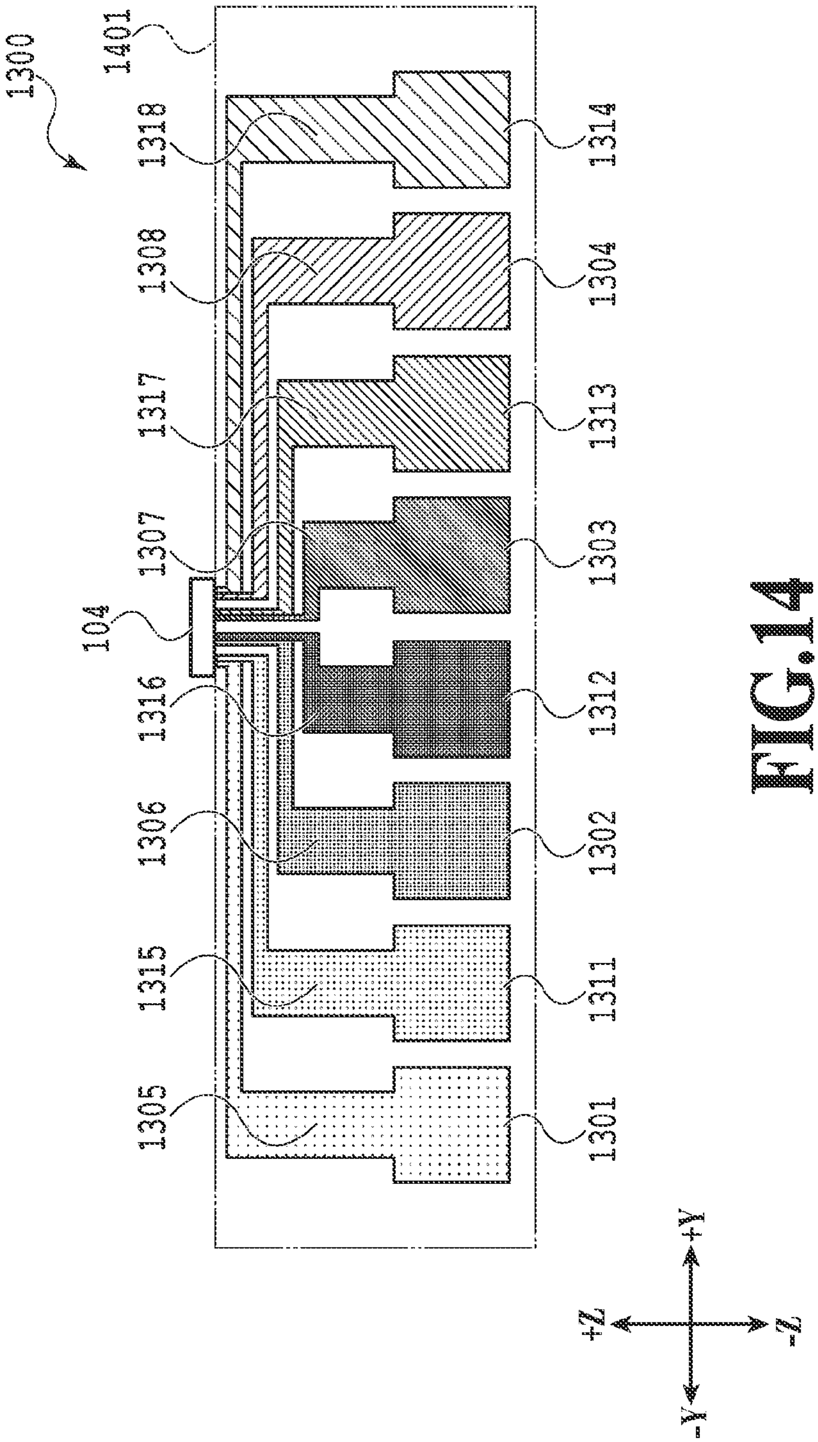
FIG. 14 is a diagram for explaining one comparative example.

FIG. 14 is a diagram for explaining a sixth comparative example.

In a liquid ejection head 1300 in the present comparative example, multicolored liquids are ejected from the one element substrate 104.

As shown in FIG. 14, the liquid ejection head 1300 in the present comparative example comprises a supply flow path 1301, a supply flow path 1302, a supply flow path 1303, and a supply flow path 1304.

Further, the liquid ejection head 1300 comprises a connection flow path 1305, a connection flow path 1306, a connection flow path 1307, and a connection flow path 1308. Furthermore, the liquid ejection head 1300 comprises a collection flow path 1311, a collection flow path 1312, a collection flow path 1313, and a collection flow path 1314. Still furthermore, the liquid ejection head 1300 comprises a connection flow path 1315, a connection flow path 1316, a connection flow path 1317, and a connection flow path 1318.

For example, in a case where the yellow ink is ejected, the ink is supplied from the supply flow path 1301 to the element substrate 104 via the connection flow path 1305. In a case where the magenta ink is ejected, the ink is supplied from the supply flow path 1302 to the element substrate 104 via the connection flow path 1306. In a case where the cyan ink is ejected, the ink is supplied from the supply flow path 1303 to the element substrate 104 via the connection flow path 1307. In a case where the black ink is ejected, the ink is supplied from the supply flow path 1304 to the element substrate 104 via the connection flow path 1308.

On the contrary, in a case where the yellow ink is collected, the ink is collected from the element substrate 104 to the collection flow path 1311 via the connection flow path 1315. In a case where the magenta ink is collected, the ink is collected from the element substrate 104 to the collection flow path 1312 via the connection flow path 1316. In a case where the cyan ink is collected, the ink is collected from the element substrate 104 to the collection flow path 1313 via the connection flow path 1317. In a case where the black ink is collected, the ink is collected from the element substrate 104 to the collection flow path 1314 via the connection flow path 1318.

As explained above, in a case where the inks of the four colors are supplied to the one element substrate and collected from the one element substrate, the supply flow path and the collection flow path are required for each color of the inks, in addition to the increase in the opening area of each supply flow path and each collection flow path. Because of this, the width (here, the length in the short-side direction) of the liquid ejection head 1300 becomes very great. Then, the length of each connection flow path becomes longer and the shape of each connection flow path becomes complicated. Consequently, the influence of the pressure loss in the ink flowing within each connection flow path becomes large. Consequently, with the configuration such as this, it is made difficult to eject the ink whose viscosity is high and a large amount of ink.

Further, even in a case where the element substrate is downsized, the density of the ejection ports in the ejection element column increases. Consequently, with the liquid ejection head having one element substrate ejecting multi-colored inks and having the circulation function, it is made difficult to eject the ink whose viscosity is high and a large amount of ink because of the pressure loss of the liquid flowing within the connection path.

From the above, by designing a configuration so that a one-color ink is ejected from one element substrate, it is made possible to implement downsizing of the element substrate and simplify the configuration of the connection flow path. That is, designing a configuration so that a one-color ink is ejected from one element substrate is effective.

Third Embodiment

In the second embodiment, the liquid ejection head having the function to circulate a one-color ink is explained. Next, a liquid ejection head having a function to circulate liquids of two colors is explained as a third embodiment. In the following, explanation of the configuration the same as or corresponding to the configuration of the first embodiment and the second embodiment is omitted by using the same name and the same symbol and different points are explained mainly.

Figure 15:
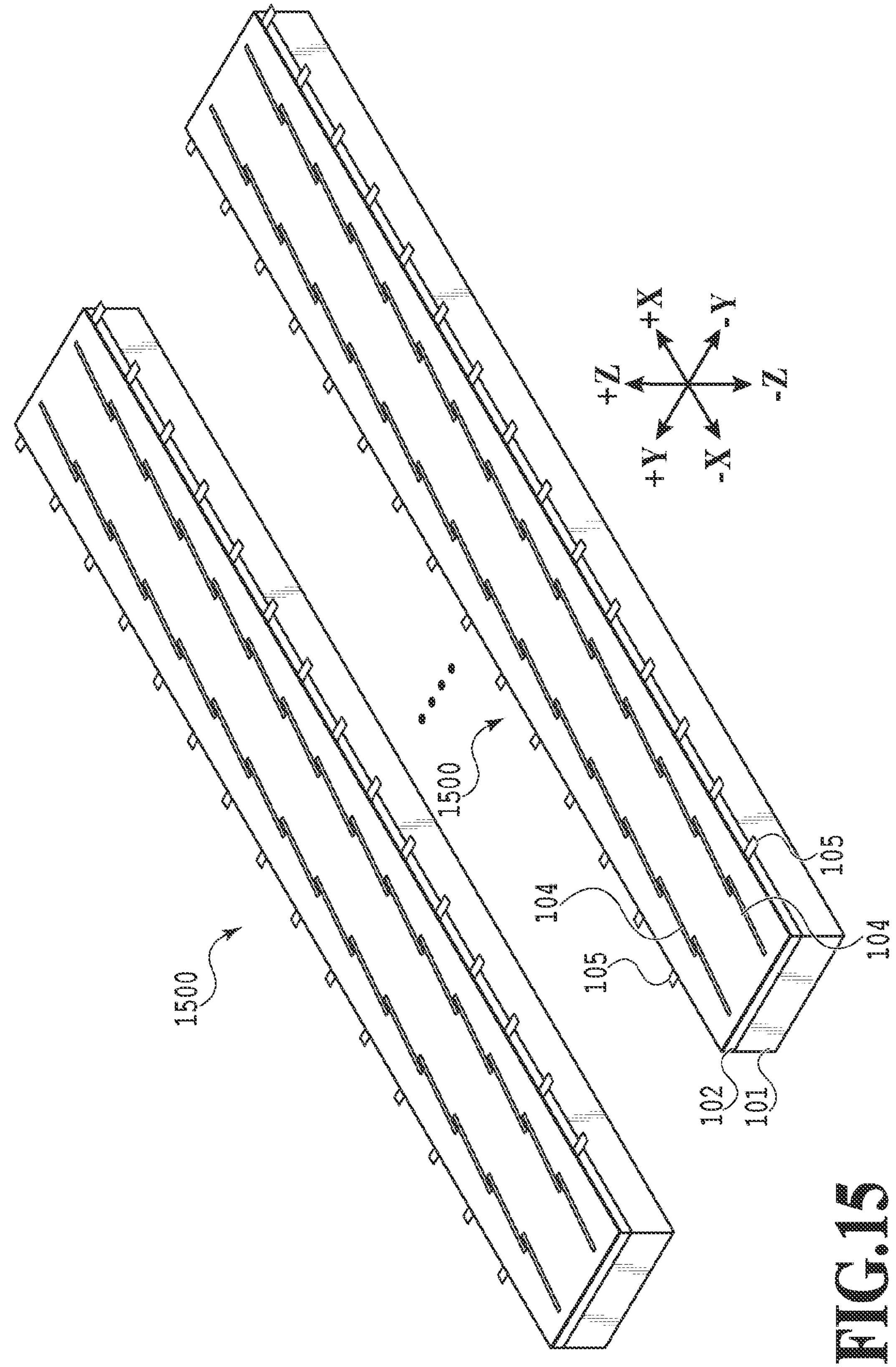
FIG. 15 is a perspective diagram schematically showing one example of a liquid ejection head in one embodiment.

FIG. 15 is a perspective diagram schematically showing one example of a liquid ejection head in the present embodiment.

As shown in FIG. 15, in a fourth liquid ejection head 1500 in the present embodiment, a plurality of the electrical wiring members 105 extends toward opposite directions (in the example shown in FIG. 15, the −Y-direction and the +Y-direction) and this point is different from the first embodiment. Further, inside the fourth liquid ejection head 1500, two types of liquid circulate and this point is also different from the first embodiment.

Figure 16:
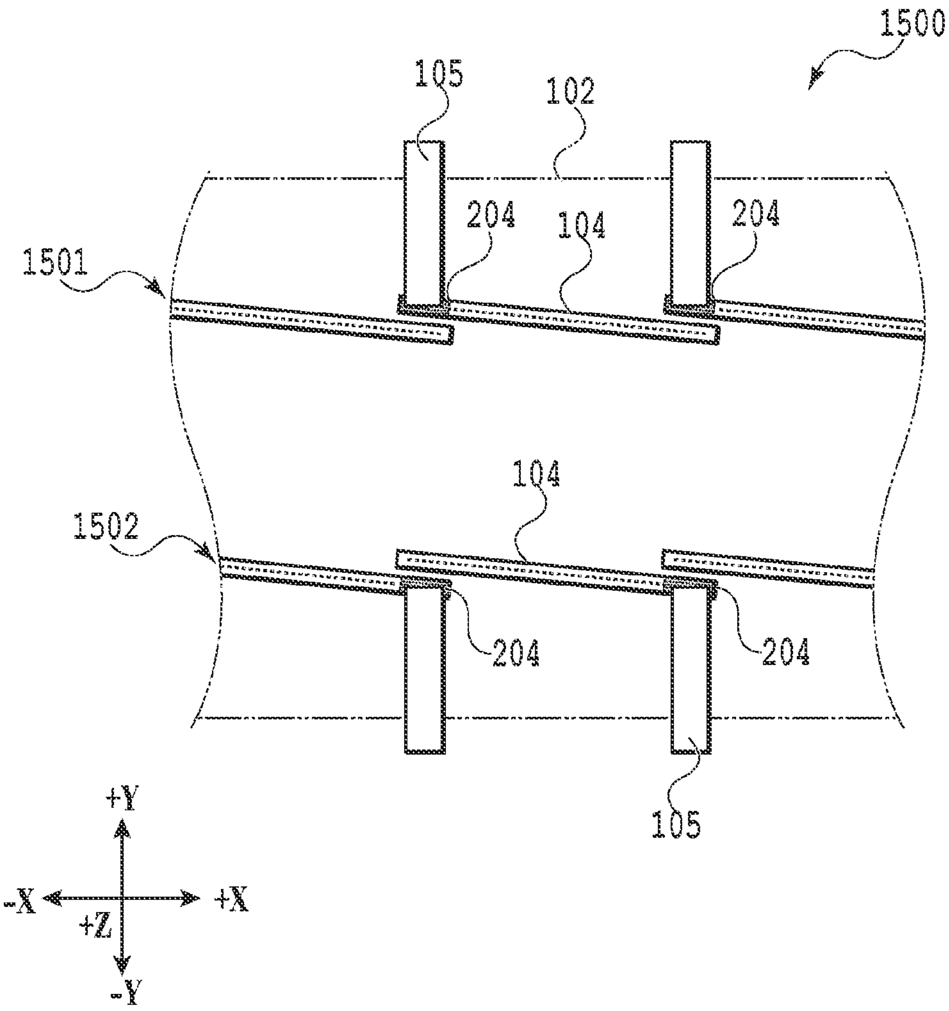
FIG. 16 is a schematic top diagram of the liquid ejection head in one embodiment.

FIG. 16 is a schematic top diagram of the fourth liquid ejection head 1500 in the present embodiment.

As shown in FIG. 16, on the top surface of the second flow path member 102, the element substrate 104 in which a first ejection element column 1501 is arranged and the element substrate 104 in which a second ejection element column 1502 is arranged are arrayed in-line, the element substrates 104 ejecting liquids whose types are different from each other. In the present embodiment, the electrical wiring member 105 electrically connected with the element substrate 104 having the first ejection element column 1501 extends toward the +Y-direction. In contrast to this, the electrical wiring member 105 electrically connected with the element substrate 104 having the second ejection element column 1502 extends toward the −Y-direction. That is, the electrical wiring members electrically connected to the electrical connection portions of the element substrates ejecting liquids whose colors are different from each other extend in the directions opposite to each other.

Figure 17:
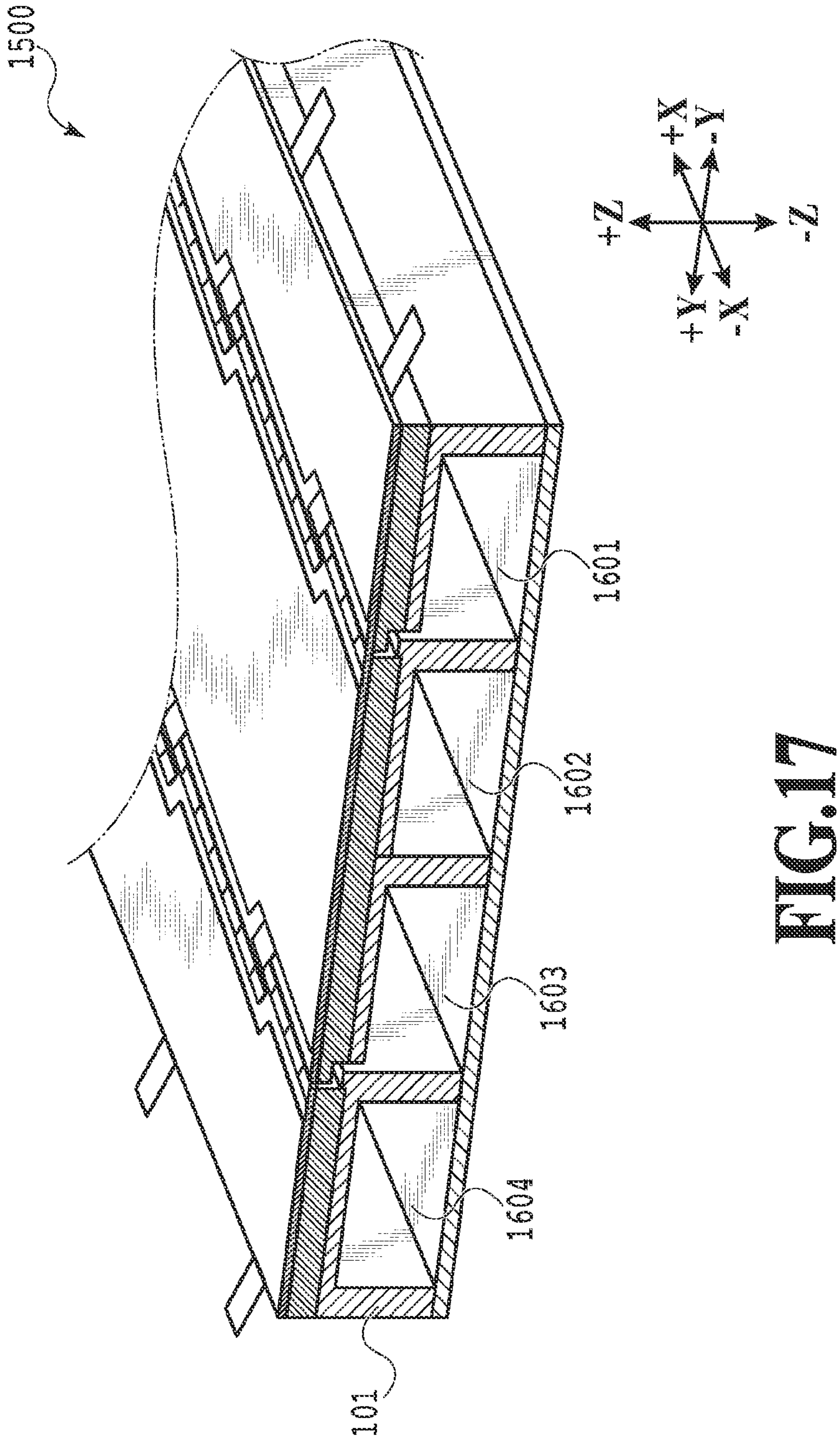
FIG. 17 is a perspective diagram schematically showing a cross section of the liquid ejection head in one embodiment.

FIG. 17 is a perspective diagram schematically showing a cross section of the fourth liquid ejection head 1500 in the present embodiment.

As shown in FIG. 17, in the first flow path member 101 in the fourth liquid ejection head 1500, a first supply flow path 1601 through which the liquid flows in a case where the liquid is ejected is formed. Further, in the first flow path member 101 in the present embodiment, a second supply flow path 1603 through which the liquid flows is formed, whose type is different from that of the liquid flowing through the first supply flow path 1601.

On the contrary, in the first flow path member 101 in the fourth liquid ejection head 1500, a first collection flow path 1602 is formed, through which the liquid flows in a case where the same type of liquid as that of the liquid flowing through the first supply flow path 1601 is collected. Similarly, in the first flow path member 101 in the fourth liquid ejection head 1500, a second collection flow path 1604 is formed, through which the liquid flows in a case where the same type of liquid as that of the liquid flowing through the second supply flow path 1603 is collected. That is, in the flow path portion in the present embodiment, the second supply flow path 1603 that supplies the liquid whose type is different from that of the liquid flowing through the first supply flow path 1601 is formed.

Then, the fourth liquid ejection head 1500 has a third element substrate in which the first ejection element column 1501 ejecting the liquid supplied from the second supply flow path 1603 is arranged and a second electrical connection member electrically connected to the third element substrate. Further, the third element substrate is arrayed along a predetermined direction (for example, the X-direction in FIG. 17) and the second electrical connection member extends in the direction (the +Y-direction) opposite to the direction (the −Y-direction) in which the electrical connection member in which the second ejection element column 1502 is arranged extends. Furthermore, in the flow path portion in the present embodiment, the second collection flow path 1604 that collects the liquid that is not ejected from the third element substrate is formed.

According to the configuration such as this, also in a case where two types of liquid circulate inside one liquid ejection head, it is possible to achieve both suppression of nonuniformity and downsizing of the element substrate. That is, according to the technique of the present disclosure, it is possible to provide an element substrate and a liquid ejection head that are compact and whose reliability is high.

OTHER EMBODIMENT

It is also possible to combine the configurations of the first embodiment to the third embodiment described above with one another.

In the first embodiment to the third embodiment, as an example of a liquid, ink is used, but the liquid does not need to be ink. For example, it may also be possible to use various printing liquids including a processing liquid or the like that is used for the purpose of improving the fixing property of ink in a printing medium, reducing gloss nonuniformity, and improving abrasion resistance.

According to the technique of the present disclosure, it is possible to provide a liquid ejection head that is compact and whose reliability of the electrical connection portion is high.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124711, filed Aug. 4, 2022, which are hereby incorporated by reference herein in its entirety.

What is claimed is:

1. A liquid ejection head having a plurality of sets of element substrates in which a plurality of ejection elements ejecting a liquid of the same type is arrayed and a plurality of sets of electrical wiring members for supplying electric power to the element substrates, wherein each of the element substrates is arrayed in a second direction inclined with respect to a first direction in which the plurality of ejection elements is arrayed, and each of the electrical wiring members is connected to a terminal arranged at one end portion of a corresponding one of the element substrates and extends in a third direction intersecting the first direction and the second direction.

2. The liquid ejection head according to claim 1, wherein one of the element substrates and an adjacent one of the element substrates include an area in which both the one and the adjacent one of the element substrates overlap each other in the third direction, and the overlap area includes an area including the end portion of the one element substrate and in which an ejection element column arranged on the one element substrate and an ejection element column arranged on the adjacent element substrate overlap each other.

3. The liquid ejection head according to claim 2, wherein a distance in the third direction from an ejection element arranged at a front edge in the first direction of the one element substrate to an ejection element arranged at a proximal end in the first direction of the adjacent element substrate is 2.6 mm or less.

4. The liquid ejection head according to claim 1, wherein in a case in which the shape of each of the element substrates is a rectangle, the length of a short side is 1.5 mm or less.

5. The liquid ejection head according to claim 1, wherein the second direction is inclined about 7 degrees with respect to the first direction.

6. The liquid ejection head according to claim 1, further comprising:

a flow path portion in which a supply flow path supplying a liquid to the element substrates is formed.

7. The liquid ejection head according to claim 6, wherein in the flow path portion, a collection flow path collecting a liquid not ejected from the element substrates is formed.

8. The liquid ejection head according to claim 7, wherein in the flow path portion, a second supply flow path supplying a liquid whose type is different from that of a liquid flowing through the supply flow path is formed, the liquid ejection head comprises:

a plurality of sets of second element substrates in which a plurality of ejection elements ejecting a liquid supplied from the second supply flow path is arrayed; and a plurality of sets of second electrical connection members for supplying electric power to the second element substrates, each of the second element substrates is arrayed along the second direction, and each of the second electrical connection members is connected to a terminal arranged on the other end portion of a corresponding one of the second element substrates and extends in a fourth direction opposite to the third direction.

9. The liquid ejection head according to claim 8, wherein in the flow path portion, a second collection flow path collecting a liquid not ejected from the second element substrates is formed.

10. A liquid ejection apparatus comprising:

a liquid ejection head having a plurality of sets of element substrates in which a plurality of ejection elements ejecting a liquid of the same type is arrayed and a plurality of sets of electrical wiring members for supplying electric power to the element substrates, wherein each of the element substrates is arrayed in a second direction inclined with respect to a first direction in which the plurality of ejection elements is arrayed and each of the electrical wiring members is connected to a terminal arranged at one end portion of a corresponding one of the element substrates and extends in a third direction intersecting the first direction and the second direction; and a liquid supply unit for supplying a liquid to the liquid ejection head.

11. The liquid ejection apparatus according to claim 10, further comprising:

a conveyance unit configured to convey a printing medium onto which ink lands.

12. An ejection module comprising:

an element substrate in which a plurality of ejection elements ejecting a liquid of the same type is arrayed along a first direction; and an electrical wiring member for supplying electric power to the element substrate, wherein the electrical wiring member is connected to a terminal arranged at one end portion of the element substrate and extends in a second direction intersecting the first direction.

* * * * *